United States Patent
Futernik et al.

(10) Patent No.: US 7,264,046 B1
(45) Date of Patent: Sep. 4, 2007

(54) AIR-CONDITIONING SYSTEM

(76) Inventors: Vladlen Futernik, 265 Garfield Ave., Laurence Harbor, NJ (US) 08879; Boris Futernik, 265 Garfield Ave., Laurence Harbor, NJ (US) 08879

( * ) Notice: Subject to any disclaimer, the term of this patent is extended or adjusted under 35 U.S.C. 154(b) by 0 days.

(21) Appl. No.: 11/717,287

(22) Filed: Mar. 13, 2007

(51) Int. Cl.
  *F25B 29/00* (2006.01)
  *B60H 1/00* (2006.01)
  *B60H 3/00* (2006.01)

(52) U.S. Cl. .................. 165/202; 165/42; 165/43; 62/236; 62/434; 62/435; 62/201; 62/244; 62/323.1; 62/323.4

(58) Field of Classification Search ............. 165/202, 165/42, 43; 62/434, 435, 244, 525, 229, 62/236, 201, 323.1, 323.4
See application file for complete search history.

(56) References Cited

U.S. PATENT DOCUMENTS

| | | | | |
|---|---|---|---|---|
| 1,891,713 | A * | 12/1932 | Jordan et al. | 62/434 |
| 2,467,398 | A * | 4/1949 | Miller | 62/236 |
| 2,746,268 | A * | 5/1956 | Sellstrom | 62/236 |
| 2,986,896 | A * | 6/1961 | Hann | 62/236 |
| 3,753,462 | A * | 8/1973 | Burger | 165/42 |
| 3,841,108 | A * | 10/1974 | Pierrat | 62/236 |
| 5,138,851 | A * | 8/1992 | Mardikian | 62/244 |
| 5,177,978 | A * | 1/1993 | Brown | 62/236 |
| 5,226,294 | A * | 7/1993 | Mayer | 62/323.1 |
| 5,287,708 | A * | 2/1994 | Hiramatsu et al. | 62/323.1 |
| 5,333,679 | A * | 8/1994 | Suzuki et al. | 165/43 |
| 6,435,273 | B1 * | 8/2002 | Futernik | 165/202 |
| 6,793,016 | B2 * | 9/2004 | Aoki et al. | 165/202 |
| 6,938,431 | B2 * | 9/2005 | Hanada | 62/201 |
| 7,069,938 | B2 | 7/2006 | Yen et al. | |
| 7,069,983 | B2 * | 7/2006 | Yakumaru et al. | 165/202 |
| 2002/0162644 | A1 * | 11/2002 | Futernik et al. | 165/43 |
| 2003/0150594 | A1 * | 8/2003 | Futernik et al. | 165/43 |

FOREIGN PATENT DOCUMENTS

| | | | | |
|---|---|---|---|---|
| JP | | 59170637 A | * | 9/1984 |
| JP | | 02175336 A | * | 7/1990 |
| JP | | 06144069 A | * | 5/1994 |
| WO | WO 99/09360 A1 | | * | 2/1999 |

* cited by examiner

*Primary Examiner*—John K. Ford
(74) *Attorney, Agent, or Firm*—Aleksandr Smushkovich

(57) ABSTRACT

An air-conditioning system embodiment for temperature control in a vehicle comprises heater cores, controllably connected to a coolant contour, outletting the conditioned air towards a person sitting in a chair, or into a food compartment. Some cores are mounted inside of chairs' backs situated in front of rear passengers, other cores are mounted in the chair back and inside the chair seat. A refrigerant-coolant heat exchanger provides heat exchange between a refrigerant contour and the coolant contour, cooling the coolant supplied to the cores. A refrigerant compressor is driven by a hydraulic motor, operated by pressurized oil delivered through a hydraulic contour from a first hydraulic pump driven by the vehicle's engine connected to the first pump through an electromagnetic clutch, or alternatively from a second hydraulic pump driven by a substitute engine, connected to the second pump through another electromagnetic clutch, both clutches are controlled by a thermostat.

7 Claims, 2 Drawing Sheets

AIR-CONDITIONING SYSTEM

FIELD OF THE INVENTION

The invention relates to air conditioner systems, particularly, but not exclusively to air-conditioning systems intended for vehicles, which vehicles can be initially designed with an air conditioner, or initially designed without an air conditioner but having only a liquid cooling system for the engine.

BACKGROUND OF THE INVENTION

There exists a wide variety of air conditioners employed at premises and inside transportation means. The proposed inventive system though substantially differs from the known devices in several aspects indicated further below.

A patent U.S. Pat. No. 6,793,016 teaches an air-conditioning unit for blowing air into a passenger's compartment and cooling a vehicle's seat. The present inventive system, in contrast, provides the cooling and heating of the blown air by means of a heat exchanger wherein the blown air is heated or cooled by hot or cold coolant liquid generally used for cooling the vehicle's engine.

A system described in another patent—U.S. Pat. No. 6,938,431 deploys two exchangers: one for cooling, and another for heating. The present inventive system deploys only one heat exchanger for cooling or heating the coolant, which coolant is further used in other heat exchangers to provide cooling or heating for different regions of the vehicle's interior.

In U.S. Pat. No. 7,069,938, a refrigerant—water heat exchanger is utilized. The proposed system uses a refrigerant—coolant (antifreeze) heat exchanger. The antifreeze coolant cannot freeze and damage the system. The inventive system additionally provides both: heating and cooling by means of only one liquid-coolant.

An air conditioner taught in U.S. Pat. No. 5,287,708 is associated with a hydraulically driven refrigerant compressor operating all the time while the vehicle's engine runs. The proposed system includes a refrigerant compressor operating only when the coolant's temperature rises, and the compressor is turned off when the temperature drops to a certain amount.

Some of the currently known air conditioning systems for vehicles (e.g. U.S. Pat. No. 6,435,273, U.S. patent application Ser. No. 10/178,009, all entirely incorporated herein by reference) deploy a hot liquid contour, e.g. utilizing an engine coolant fed into at least one coolant/air heat exchanger to heat the air; and a refrigerant contour, e.g. utilizing a known refrigerant, fed into a refrigerant/coolant heat exchanger to cool the coolant that may further be used in the aforesaid at least one coolant/air heat exchanger to cool the air to a required temperature for the vehicle interior.

Yet, those system are not highly efficient at least for two reasons: a) the vehicle's main engine has to run all the time to provide power for the refrigerant contour, or heat for the coolant contour, which causes significant loss of energy and high level of pollution (e.g. when a bus driver is waiting for passengers while there are no passengers in the bus); b) the produced heat or cool air provides all passengers of the vehicle with the same air temperature, though different spots of each passenger's body may require different temperatures (e.g. the front of one passenger's body needs less cool air, but the back is sweating and requires more cool air, whereas another passenger does not need the conditioned air at all), and some regions of the vehicle's interior may not require the conditioned air (e.g. when the respective seats are empty).

BRIEF SUMMARY OF THE INVENTION

The above-mentioned drawbacks are addressed in the instant disclosure. According to the present invention, there is deployed an air-conditioning system having at least one liquid/air heat exchanger (heater core), and heat/cool supplying means to selectively produce hot liquid or cooled liquid and deliver it to the at least one heater core, whereby, selectively heating or cooling the air passing through the at least one heater core outletting the conditioned air into the vehicle interior.

Similarly to the above-mentioned systems, the heat/cool supplying means of the present system include a hot liquid (heated coolant) contour for circulation of the engine's coolant fed into the at least one heater core to heat the air passed through the heater core (conditioned air); and a refrigerant contour, for circulation of a known refrigerant, fed into a refrigerant/coolant heat exchanger to cool the coolant that may further be used in the aforesaid at least one heater core to cool the air to a required temperature for the vehicle interior.

Distinctly from the mentioned systems, several important objectives are achieved by this invention. One of them is to provide an extremely economical and efficient vehicle air-conditioning system that can be easily and quickly installed and connected to or removed from the regular engine cooling system, and which is wholly located in the engine compartment or in different conveniently accessible locations of the vehicle.

Another objective is to enable heating or cooling a passenger and/or driver chairs' seats and backs individually from the front, the back, and the underneath by providing for installation of additional liquid/air heat exchangers (heater cores) in the corresponding locations of the dashboard or passengers' compartment of the vehicle. As in the previous systems, the inventive system optionally provides heating or cooling food compartments of the vehicle if necessary. The system requires less amount of refrigerant than the above described or other known air-conditioning systems.

The refrigerant contour includes a compressor drawing the refrigerant into a condenser, as in the previous systems. The present system further comprises an oil circulating hydraulic contour, including a hydraulic motor rotating the compressor, which motor is operated preferably by oil under pressure delivered through a flexible hose from an oil hydraulic pump driven by the main vehicle engine and/or a less powerful substitute engine connected by an electromagnetic clutch to the compressor. Thus, when the vehicle is parked, the air-conditioning system may still be on and more efficiently operate using the substitute engine, saving fuel, and reducing pollution.

In summary, this new inventive system has lower costs and higher efficiency than the known systems currently in use from both the viewpoints of manufacturing and operative maintenance. The air-conditioning system can be installed in several types of motor vehicles, preferably in buses, trucks, airplanes, ships, and other transportation means having enough room to install the system.

Known air condition systems, as a rule, heat or cool the whole volume of a passengers' compartment or a cabin. It is very common that one (only the driver) or two persons (the driver and a passenger) are present in a vehicle and it is not necessary to cool the whole volume of interior. In buses, airplanes, ships, trains, etc. passengers may also need individual microclimate.

The known existing vehicle air condition systems use the Carnot cycle and typically a small car needs minimum 3.7 KW of energy. While consuming substantial energy, they cannot selectively heat or cool different parts of passengers' bodies to create desirable comfort.

It is known that the human body produces heat of about 120 Kcal/hr, which heat is absorbed by the surrounding air. The known cooling systems, providing air conditioning of the whole volume of the vehicle, also need to cover additional heat from sun radiation, insufficient insulation of the passengers' compartment, heat from the engine and transmission.

Medical recommendations set a desirable difference between the outside temperature and the temperature inside of the passenger compartment no more than from 5 to 10.degree.C, as indicated in the appended TABLE 1.

The human body is also heat resistant. The heated front is sweating while the cooled back is freezing and vice-versa. It means that the human body needs to be cooled or heated from the front and back in different modes. Therefore, the proposed system should provide individual microclimate for body parts of each passenger and the driver. It may be usable generally for any vehicle having a liquid cooling system for the engine.

A substantial feature of the proposed system is the use of an additional (substitute) engine to substantially operate an oil hydraulic pump, controllably supplying pressurized oil to at least a hydraulic motor coupled to the refrigerant compressor, for instance, during the time when the vehicle is parked.

The compressor-condenser unit can be installed at any place of vehicle: on the roof, under the vehicle or under the hood. The heater cores can be controllably connected to hot or cold coolant conduits, and regulated by valves.

An embodiment of the inventive device for temperature control in a vehicle comprises at least one individual heater core with a blower installed in front of preferably every chair of the vehicle, at least one heater core with a blower mounted inside of preferably every chair of the vehicle, preferably in the back of the chair and underneath of the chair seat and optionally a food compartment heater core; the heater cores are controllably connected to the coolant circulating contour of the vehicle; a refrigerant/coolant heat exchanger installed within the refrigerant circulating contour and provides heat exchange with the coolant circulating contour, which cools the coolant (antifreeze) supplied for cooling the heater cores; a refrigerant compressor driven by a hydraulic motor, which hydraulic motor is operated by oil under pressure delivered through an oil hydraulic circulating contour from a first oil hydraulic pump driven by the vehicle's engine connected to the first hydraulic pump through an electromagnetic clutch controlled by a thermostat, or alternatively from a second oil hydraulic pump driven by a substitute engine, connected to the second hydraulic pump through another electromagnetic clutch controlled by the thermostat.

BRIEF DESCRIPTION OF THE DRAWINGS

Identical reference numerals generally refer to the same elements on different figures. A first-time introduced element in the description is enclosed into parentheses.

DESCRIPTION OF EXEMPLARY PREFERRED EMBODIMENTS

Figure 1:
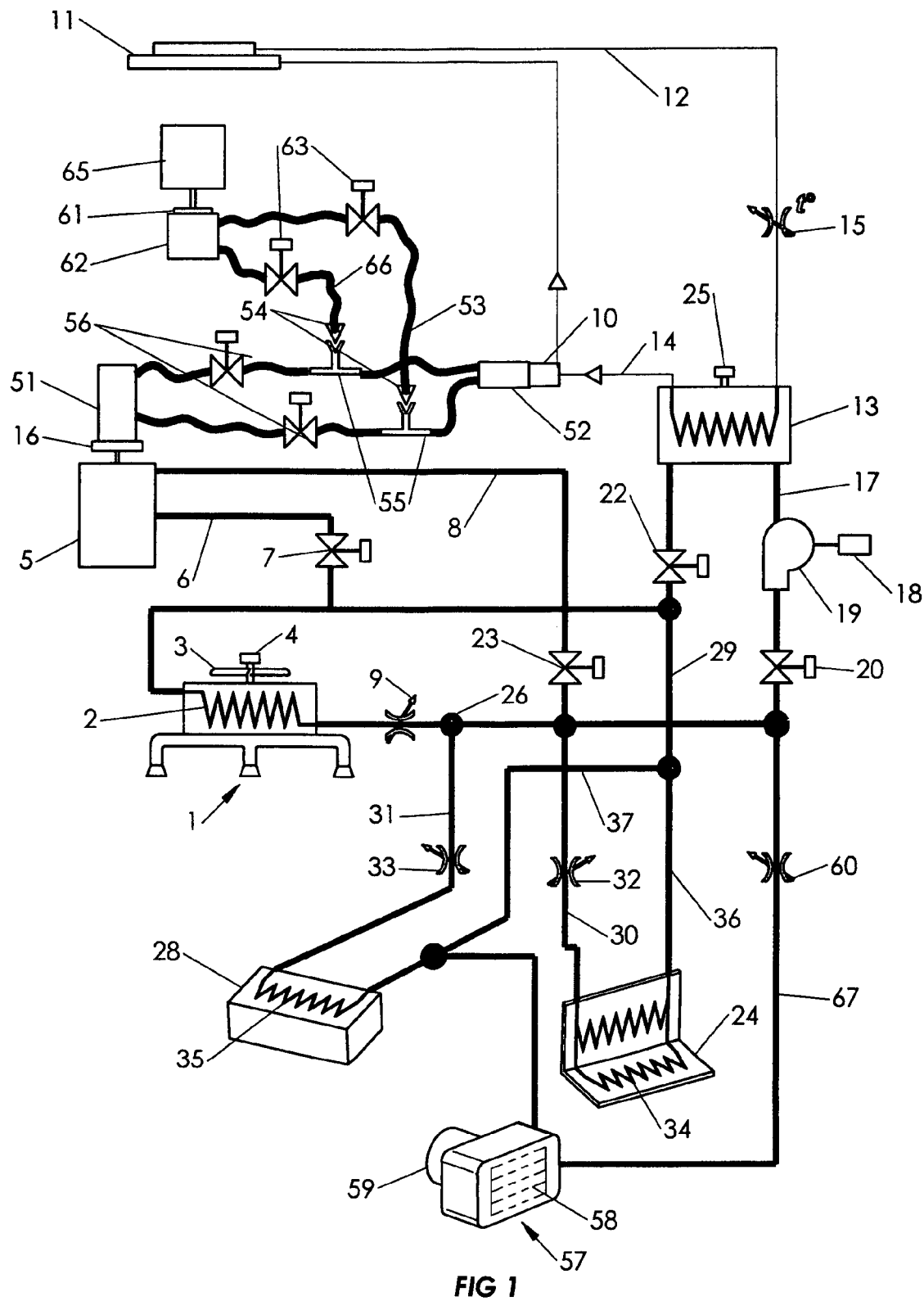
FIG. 1 is a schematic view showing an embodiment of the device for temperature control in a vehicle in accordance with the present invention.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

A preferred embodiment of the inventive device (air-conditioning system), illustrated on FIG. 1, for temperature control in a vehicle comprises a control system including conventional elements and programmed instructions (not illustrated); and at least two circulation contours: a refrigerant circulating contour (depicted on FIG. 1 by a thin line), and a coolant circulating contour (depicted on FIG. 1 by a bold line). The coolant contour includes an air outlet unit (1), provided with several outlets. A known heater core (2) is located before the inlets inside of the unit 1. A fan (3), driven by a motor (4) with a speed adjustable unit (not shown) is located behind the heater core 2 so as to blow air with a temperature provided by the heater core 2 into the air outlet unit 1.

A vehicle engine (5) has a cooling system (not illustrated), which cooling system is connected by a return coolant conduit (6), being a portion of the coolant contour, with the heater core 2. A two-way directional valve (7) is located between the conduit 6 and the heater core 2. A hot coolant conduit (8) (a portion of the coolant contour, through which the coolant is supplied at least to the heater core 2) connects the outlet of the heater core 2 to the cooling system of the engine 5, and is provided with a two-way directional valve (23). A flow-control proportional valve (9) controls the coolant flow and a portion of the hot coolant remaining in the heater core 2 for temperature control.

As illustrated on FIG. 1, the inventive device comprises the refrigerant circulating contour, including a refrigerant compressor (10), which supplies a vaporous refrigerant to a condenser (11). The refrigerant, liquefied in the condenser 11, is supplied through a refrigerant supply conduit (12) (portion of the refrigerant circulating contour) into a refrigerant-coolant heat exchanger (13), in which the refrigerant cools the engine coolant, and then is drawn back through a return refrigerant conduit (14). The design of the refrigerant-coolant heat exchanger 13 is described in detail in the above-mentioned patent U.S. Pat. No. 6,435,273 incorporated by reference (see e.g. FIG. 3a of U.S. Pat. No. 6,435,273).

An expansion valve (15) is provided within the refrigerant supply conduit 12. The valve 15 controls the operating temperature by controlling the pressure of refrigerant and its flow into the heat exchanger 13. A thermostat (25), sensing the temperature in the refrigerant-coolant heat exchanger 13, controls at least a first electromagnetic clutch (16) (e.g. of a solenoid type) coupled to the engine 5.

The inventive device comprises an oil circulating hydraulic contour (illustrated by a waved line on FIG. 1), including a first oil hydraulic pump (51). The hydraulic pump 51 is connected with the engine 5 via the clutch 16. Thusly, the clutch 16 substantially controls at least a portion of the operation time of the compressor 10, and therefore the supply of refrigerant into the heat exchanger 13.

The hydraulic pump 51 is connected by flexible high-pressure hoses (53) to an oil hydraulic motor (52) driving the compressor 10. Two three-port T-shaped connectors (55), (also called a "tee"), are disposed in a suitable place within the hoses 53. Two quick-disconnect male/female connectors (54) are coupled to the tees 55.

Two two-way directional valves (56) (e.g. of a solenoid type) are installed in the hoses 53 at the inlet and outlet ports of the pump 51, as shown on FIG. 1. The valves 56 are so controlled that shut the inlet and outlet ports when the clutch 16 disconnects the pump 51 from the engine 5.

The inventive device comprises a substitute engine (65) consuming a predetermined power, essentially less than the power of the engine 5, from a power source another than the engine 5. The substitute engine 65 can be implemented as an internal combustion engine, or, for example, an electrical motor powered by an outside conventional power supply. A second clutch (61), similar to the clutch 16, is connected to the engine 65. A second oil hydraulic pump (62), as a portion of the oil circulating hydraulic contour, is controllably connected via the clutch 61 to the engine 65. The clutch 61 is also controlled by the thermostat 25.

The hydraulic pump 62 is connected by flexible high-pressure hoses (66) via the quick disconnect connectors 54, the tees 55, the hoses 53 to the oil hydraulic motor 52 driving the compressor 10. Two two-way directional valves (63) (e.g. of a solenoid type) are installed in the hoses 66 at the inlet and outlet ports of the pump 62, as shown on FIG. 1. The valves 63 are so controlled that shut the inlet and outlet ports when the clutch 61 disconnects the pump 62 from the engine 65. Thusly, the clutch 61 substantially controls at least a portion of the operation time of the compressor 10, and therefore the supply of refrigerant into the heat exchanger 13.

The coolant, which is cooled in the heat exchanger 13 through heat exchange by the refrigerant and further driven by a pump (19) rotated by a motor (18), is supplied through a cold coolant supply conduit (17) to the heater core 2. A two-way directional valve (20) is provided at a suitable place in the conduit 17. A common return coolant conduit (29) connects at least the outlet of the heater core 2 with the heat exchanger 13 and is provided with a two-way directional control valve (22).

Reference numeral (24) identifies an auxiliary unit, in this embodiment incorporated into a driver's or passenger's chair in the vehicle. The unit 24 includes a heater core (34), similar to the heater core 2, a blower (not shown), and at least two outlets (not shown). A first outlet of the unit 24 outputs the conditioned air forward in a region of the back of the chair, whereas a second outlet outputs the conditioned air upward in the region of the seat of the chair. The unit 24 is connected by a return coolant conduit (36) to the common return coolant conduit 29. The auxiliary unit 24 is provided with coolant supply conduits (30) having flow-control proportional valve (32). Other vehicle chairs may be designed with similar auxiliary units.

In this embodiment, reference numeral (28) identifies a food-storing device, for example, a container for food, beverages, etc. The food container 28 includes a heater core (35). The food container 28 is provided with coolant supply conduits (31) having flow-control proportional valve (33). The food container 28 includes a return coolant conduit (37) connected to the common return coolant conduit 29.

Reference numeral (57) in this embodiment identifies an auxiliary unit, incorporated into the back of a front chair so that is capable to provide the conditioned air blowing towards a passenger who sits on a rear chair behind the front chair. Such auxiliary unit can also be installed in the dash board of the vehicle for conditioning the air for the driver and the front passenger.

The unit 57 includes a heater core (58) (similar to the heater core 2), and a fan (59) located behind the heater core 58 to blow the conditioned air. The heater core 58 provides a necessary temperature. The unit 57 is provided with a coolant supply conduit (67) and the return coolant conduit 36. A regulative valve (60) is disposed within the supply conduit 67. The valve 60 can be regulated manually through conventional means by the passenger, who sits on the rear chair. Optionally, the valve 60 can be regulated automatically (additional temperature sensors can be mounted in suitable places of the interior of the vehicle).

OPERATION OF THE EXEMPLARY PREFERRED EMBODIMENTS

The device in accordance with a preferred embodiment of the present invention operates in several modes.

First Mode

When it is necessary to heat the air in the vehicle space, the valves 20 and 22 are closed, while the valves 7 and 23 are open. The coolant heated by the engine 5 is supplied through the conduit 8 into the heater core 2 and heats the same, and the fan 3 blows air through the heater core 2 into the air outlet unit 1, so as to heat the inner space of the vehicle. The slightly cooled coolant is returned back to the engine 5 through the conduit 6.

When it is necessary to cool the air in the vehicle space, the valves 7 and 23 are closed and the valves 20 and 22 are open. The coolant, which is cooled in the heat exchanger 13, is supplied through the conduit 17 into the heater core 2, and cools the same, and the fan 3 blows cold air into the air outlet unit 1, whereupon the slightly heated coolant is returned back into the heat exchanger through the return coolant conduit 29.

In the inventive device, the temperature therefore can be controlled by the control system, using the valve 9, that controls the coolant flow and a portion of the hot coolant remaining in the heater core 2, and thereby the temperature of air flowing out of the outlet unit 1. The temperature of coolant can be measured by the thermostat 25 cooperating with the clutch 16, disengaging the pump 51 from the engine 5, and thereby discontinuing the pressurized oil supply to the hydraulic motor 52. The desirable temperature can also be regulated by changing the speed of the fan 3 manually or automatically. These three controls can be performed individually and separately from one another, or jointly.

Second Mode

In accordance with a preferred embodiment of the present invention, it is possible to heat or cool the chair incorporating the auxiliary unit 24.

For heating the chair, for example in cold weather, the heated coolant is supplied through the conduit 8 and 30 into the heater core 34 inside the passenger chair, and the degree of heating is regulated by the valve 32. The coolant, given out a part of its heat within the heater core 34, is returned through the conduits 36, 29 and 6.

For cooling the passenger chair, for example in warm weather, the cold coolant is supplied through the conduits 17 and 30 in to the heater core 34, and the degree of cooling is controlled by the valve 32. The coolant is then returned through the conduits 36 and 29.

Third Mode

In accordance with an embodiment of the present invention, it is possible to heat or cool the auxiliary unit 57 from the front.

For heating the seat from the front for example in cold weather, the heated coolant is supplied through the conduits 8 and 67 into the heater core 58 inside the front chair, and the degree of heating is regulated by the valve 60. The coolant is returned through the conduits 37, 29 and 6.

For cooling the front seat, for example in warm weather the cold coolant is supplied through conduits 17 and 67 into the auxiliary unit 57, and the degree of cooling is controlled by the valve 60, and the coolant is then returned through the conduits 36 and 29.

The food storage compartment 28 can be heated, for example for keeping the food and beverages hot, by supplying the heated coolant through the conduits 8 and 31 to the heater core 35, and the degree of heating can be controlled by the valve 33. The coolant is then returned through the conduits 37, 29 and 6.

Also, the food container 28 can be cooled, for example, to store food and beverages for consumption in a cold condition, by supplying the cooled coolant through the conduits 17 and 31 into the heater core 35, and the degree of heating can be controlled by the valve 33. The coolant is returned through the conduits 37 and 29.

Switching The Vehicle's Engine to The Substitute Engine

As mentioned above, the refrigerant compressor 10 is driven by the hydraulic motor 52, operated by oil under pressure, delivered through the hoses 53 either from the oil hydraulic pump 51 driven by the vehicle's engine 5 or from the oil hydraulic pump 62 driven by the substitute engine 65 through the corresponding electromagnetic clutches 16 and 61 regulated by the thermostat 25.

When the vehicle is parked, but requires maintaining a certain temperature in the interior, the main vehicle's engine 5 can be shut off, whereas the substitute engine 65 can be started. This may be performed, e.g. by the driver manually instructing the control system, or automatically via programmable instructions. The control system disengages the pump 51 from the engine 5 through the clutch 16, closes valves 56, opens valves 63, engages the pump 62 with the engine 65 through the clutch 61. Thereafter the hydraulic motor 52 will be supplied with pressurized oil from the pump 62, saving fuel and reducing pollution.

A MODIFICATON OF THE INVENTION

Figure 2:
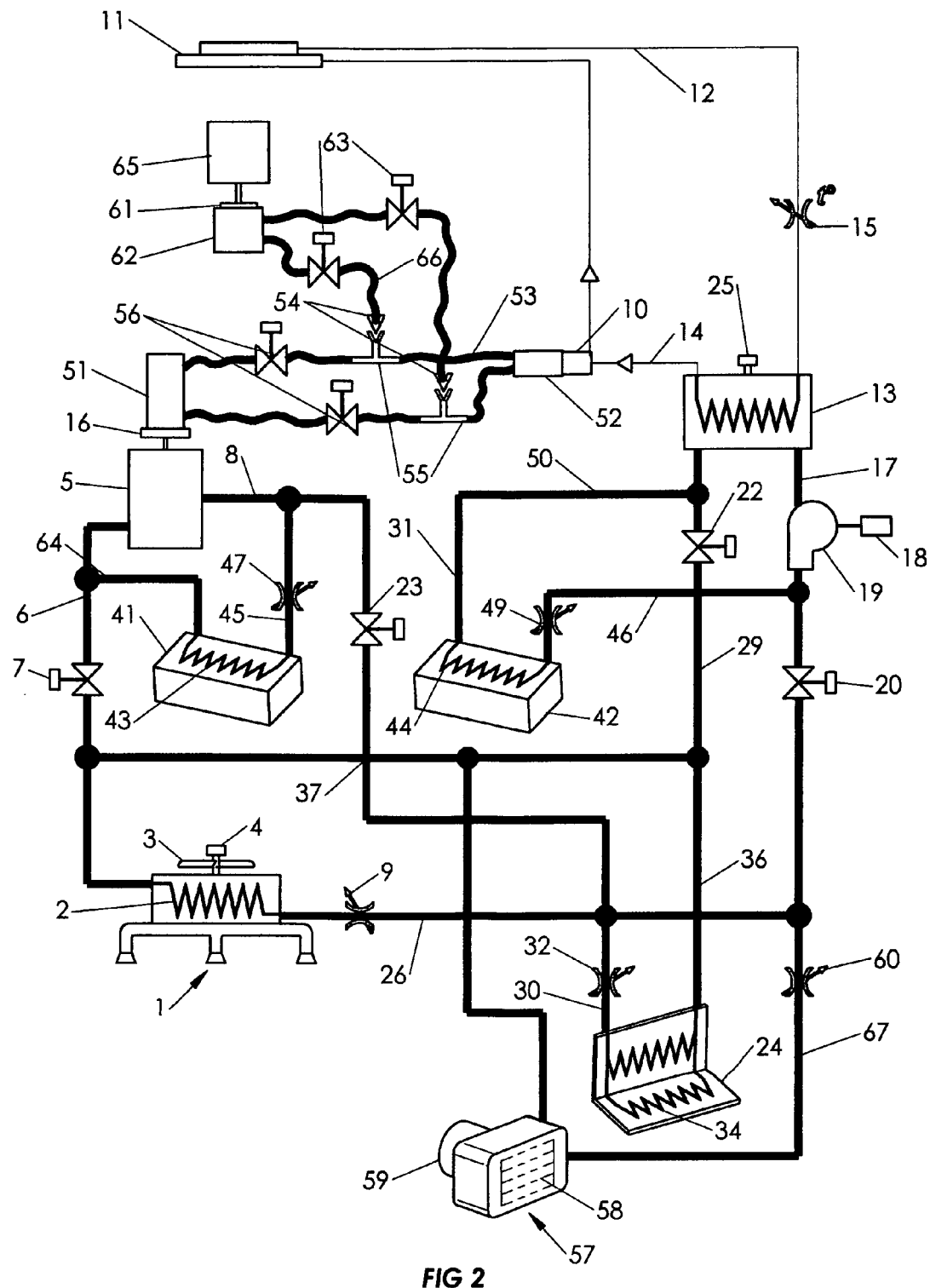
FIG. 2 is a schematic view showing another modification of the device for temperature control in a vehicle in accordance with the present invention.

FIG. 2 shows a further modification of the present invention. In this modified embodiment, the inventive device includes two food storage containers (41) and (42) provided with two heater cores (43) and (44) respectively. The inventive device includes coolant supply conduits (45) and (46) with respective two-way directional control valves (47) and (49), and two respective coolant return conduits (64) and (50).

When the heater core 44 is supplied with the cold coolant through the conduits 17 and 46, the food is cooled in the food storage container 42. When the heater core 43 is supplied with the hot coolant through the conduits 8 and 45 the food is heated in the food storage container 41. For these purposes, the control system controls the valves 47 and 49.

CONCLUSION

A working sample of the proposed air conditioning system has been tested and indicates energy saving for a partially loaded vehicle of about 15%-25%, which saves fuel and significantly reduces pollution.

It will be understood that each of the elements described above, or two or more together, may also find a useful application in other types of constructions from the types described above.

While the invention has been illustrated and described as embodied in a device for temperature control in a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

APPENDIX

TABLE 1

|  | Comfort condition Outside temperature degree C. | | | | |
| --- | --- | --- | --- | --- | --- |
|  | +25 | +30 | +35 | +40 | +45 |
|  | Passenger compartment parameters | | | | |
| Temperature C. | +21 | +23 | +26 | +30 | +35 |
| Humidity | 60% | 55% | 50% | 45% | 40% |

We claim:

1. A device for temperature control in a vehicle with a main engine, said device comprising:

refrigerant means forming a refrigerant circulation contour including at least
a refrigerant, and
a compressor for compressing the refrigerant;

coolant means forming a coolant circulation contour including
a coolant deployed for cooling the main engine and for heating and cooling the vehicle interior,
a heating portion of the coolant contour,
a cooling portion of the coolant contour being particularly cooled by the refrigerant via heat exchange, and
a heat exchanging means providing said heat exchange;

a temperature sensing means cooperating with the heat exchanging means and substantially regulating the temperature of said coolant;

a plurality of air temperature regulating units disposed in the vehicle interior, said regulating units being controllably alternatively connected to said heating portion or said cooling portion of the coolant contour;

a substitute engine means installed in the vehicle, powered separately from and generally consuming less power than the main engine; and hydraulic driving means forming a hydraulic circulation contour including
a predetermined operating liquid,
a hydraulic motor capable of rotating said compressor, a first hydraulic pump capable to create a predetermined pressure of the operating liquid in the hydraulic circulation contour for driving the hydraulic motor, a first clutch, regulated by said temperature sensing means, controllably engaging and disengaging the first pump with the main engine, a second hydraulic pump capable to create a predetermined pressure of the operating liquid in the hydraulic circulation contour for driving the hydraulic motor, and a second clutch, regulated by said temperature sensing means, capable to controllably engage the second pump with the substitute engine means when the first pump being disengaged from the main engine, and disengage the second pump from the substitute engine means when the first pump being engaged with the main engine.

2. The device according to claim 1, wherein said regulating units each including a fan, and the temperature of the conditioned air being output from the regulating units capable to be controlled by changing the speed of the fan.

3. The device according to claim 2, wherein said changing the speed of the fan being regulated by at least one of the following manners: manually or automatically.

4. The device according to claim 3, wherein the temperature of the conditioned air output from the regulating units capable to be additionally regulated by engaging and disengaging said first clutch or said second clutch.

5. The device according to claim 1, wherein said plurality of temperature regulating units comprising at least:

a first regulating unit, including a blower, disposed in front of a chair of the vehicle and capable of blowing the conditioned air backward substantially at the face of a person sitting in the chair; and a second regulating unit, including a blower disposed inside the chair, the second regulating unit including a lower outlet disposed inside the chair seat, capable of blowing the conditioned air substantially upward, and an upper outlet disposed inside the chair back, capable of blowing the conditioned air substantially forward, thereby creating an air temperature distribution desirable for said person sitting in the chair.

6. The device according to claim 5, wherein the chair being a rear passenger chair, and the first regulating unit having an outlet mounted into the rear surface of the back of another chair situated in front of said rear passenger chair.

7. The device according to claim 1, wherein the vehicle comprising at least one food storage compartment; and said plurality of temperature regulating units comprising:

at least one heat exchange means for controllably supplying the heated coolant for heating the food in the food compartment, when being connected to said heating portion of the coolant contour, or alternatively for controllably supplying the cooled coolant for cooling the food in the food compartment, when being connected to said cooling portion of the coolant contour.

* * * * *